(12) United States Patent
    Nobuhara

(10) Patent No.: US 12,636,788 B2
(45) Date of Patent: May 26, 2026

(54) ROBOT CONTROL DEVICE, ROBOT CONTROL SYSTEM, AND ROBOT CONTROL METHOD

(71) Applicant: FANUC CORPORATION, Minamitsuru-gun (JP)

(72) Inventor: Atsushi Nobuhara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 188 days.

(21) Appl. No.: 18/033,904

(22) PCT Filed: Dec. 1, 2021

(86) PCT No.: PCT/JP2021/044048
    § 371 (c)(1),
    (2) Date: Apr. 26, 2023

(87) PCT Pub. No.: WO2022/124153
    PCT Pub. Date: Jun. 16, 2022

(65) Prior Publication Data
    US 2023/0405825 A1    Dec. 21, 2023

(30) Foreign Application Priority Data
    Dec. 8, 2020    (JP) ................................. 2020-203723

(51) Int. Cl.
    *B25J 9/16*        (2006.01)
(52) U.S. Cl.
    CPC .................................... *B25J 9/1689* (2013.01)
(58) Field of Classification Search
    CPC ....... B25J 9/16; B25J 9/1689; H04L 12/4641; Y02P 90/02
    See application file for complete search history.

(56) References Cited

U.S. PATENT DOCUMENTS

2007/0081541 A1*  4/2007  Umekage ............ H04L 12/4641
                                                        370/395.2
2008/0125908 A1*  5/2008  Sjoberg .................... B25J 13/06
                                                        901/4
(Continued)

FOREIGN PATENT DOCUMENTS

CN          1871821          11/2006
CN          111052009          4/2020
(Continued)

OTHER PUBLICATIONS

International Search Report issued Feb. 22, 2022, in International (PCT) Application No. PCT/JP2021/044048, with English translation.

*Primary Examiner* — Dale Moyer
(74) *Attorney, Agent, or Firm* — Wenderoth, Lind & Ponack, L.L.P.

(57)            ABSTRACT

A combination of a plurality of robots is changed in accordance with work and communication loads between the robots is reduced. A robot control device is connected to a line concentrator and constitutes a virtual local area network together with at least one other robot control device connected to the line concentrator. The robot control device includes a setting unit for setting a plurality of setting information items of the virtual local area network, a storage unit for storing the plurality of setting information items, and a transmission unit for transmitting, to the line concentrator, setting request information for the setting information selected from the plurality of setting information items. The robot control device may be configured to send an instruction to start a tracking operation to the at least one other robot control device via the transmission unit and the line concentrator.

7 Claims, 8 Drawing Sheets

(56) References Cited

U.S. PATENT DOCUMENTS

| | | | |
|---|---|---|---|
| 2011/0231014 A1* | 9/2011 | Krajewski | B25J 5/005 |
| | | | 901/1 |
| 2013/0282148 A1* | 10/2013 | Koyama | G05B 19/4185 |
| | | | 700/56 |
| 2016/0078583 A1* | 3/2016 | Nishitani | H04N 23/80 |
| | | | 348/207.1 |
| 2016/0124412 A1* | 5/2016 | Fujita | B25J 9/0084 |
| | | | 901/6 |
| 2018/0332002 A1* | 11/2018 | Nakamura | G05B 19/41855 |
| 2020/0267094 A1* | 8/2020 | Maruyama | H04W 72/51 |
| 2021/0067483 A1* | 3/2021 | Kurokawa | H04L 61/5046 |
| 2022/0179386 A1* | 6/2022 | Ouchi | H04L 41/0866 |

FOREIGN PATENT DOCUMENTS

| | | |
|---|---|---|
| JP | 2018-092207 | 6/2018 |
| JP | 2018-191199 | 11/2018 |
| JP | 2020-187486 | 11/2020 |
| WO | 2012/090291 | 7/2012 |

* cited by examiner

FIG. 3

VLAN SETTING

| VLAN MODE | SWITCHPORT MULTIPLE VLAN |
|---|---|
| MANAGEMENT PORT | 1 |

| PORT | GROUP | PORT | GROUP |
|---|---|---|---|
| P1 | UV–A | P4 | CV–A1 |
| P2 | CV–A1 | P5 | —— |
| P3 | CV–A1 | P6 | —— |

| MANAGEMENT VLAN | UV–A |
|---|---|

FIG. 4

VLAN SETTING

| VLAN MODE | SWITCHPORT MULTIPLE VLAN |
|---|---|
| MANAGEMENT PORT | 1 |

| PORT | GROUP | PORT | GROUP |
|---|---|---|---|
| P1 | UV–A | P4 | CV–A1 |
| P2 | — | P5 | — |
| P3 | CV–A1 | P6 | — |

| MANAGEMENT VLAN | UV–A |
|---|---|

FIG. 5

ROBOT CONTROL DEVICE, ROBOT CONTROL SYSTEM, AND ROBOT CONTROL METHOD

TECHNICAL FIELD

The present invention relates to a robot control device for making settings for a virtual local area network (hereinafter referred to as a VLAN) in a network in which a plurality of robots are connected via a line concentrator, a robot control system, and a robot control method.

BACKGROUND ART

Patent Document 1 describes a computer system for a production line in which a line concentrator such as a hub causes pieces of factory equipment having roles of the same kind to belong to the same VLAN so that data is efficiently distributed in a manufacturing line network. It is described that each piece of factory equipment includes a computer that is connected to a robot arm to control the robot arm.

Patent Document 1: Japanese Unexamined Patent Application, Publication No. 2018-191199

DISCLOSURE OF THE INVENTION

Problems to be Solved by the Invention

There exists a function of, in a robot control system in which a plurality of robots are connected via a line concentrator, performing communication among the robots by Ethernet (registered trademark) to prevent interference among the robots or synchronize motions of the robot. In this case, it is desirable that communication data is transmitted/received as smoothly as possible. However, if it is tried to perform communication at a high speed, network traffic increases. As a result, there may be a case where data does not reach but is omitted or a case where it becomes necessary to retransmit data. In a robot control system in which a virtual LAN is set in a network in which a plurality of robots are connected via a line concentrator, it is possible to make communication smooth by using broadcast for data transmission and performing communication only among necessary robots. A combination of a plurality of robots, however, changes according to work. Therefore, it is desired to change the combination of a plurality of robots according to work to perform communication only among necessary robots.

Means for Solving the Problems (1) A first aspect of the present disclosure is robot control device connected to a line concentrator and constituting a virtual local area network together with at least one other robot control device connected to the line concentrator, the robot control device including:

a setting unit setting a plurality of pieces of setting information about the virtual local area network;

a storage unit storing the plurality of pieces of setting information set by the setting unit; and a transmission unit transmitting, to the line concentrator, setting request information requesting setting to a piece of setting information selected from among the plurality of pieces of setting information.

(2) A second aspect of the present disclosure is a robot control system including a plurality of robot control devices controlling a plurality of robots, respectively, and a line concentrator connected to the plurality of robot control devices and being capable of constituting a virtual local area network among at least two robot control devices among the plurality of robot control devices, wherein one robot control device among the at least two robot control devices includes a setting unit setting a plurality of pieces of setting information about the virtual local area network, a storage unit storing the plurality of pieces of setting information set by the setting unit; and a transmission unit transmitting, to the line concentrator, setting request information requesting setting to a piece of setting information selected from among the plurality of pieces of setting information; and the line concentrator sets the virtual local area network among the at least two robot control devices, based on the setting request information.

(3) A third aspect of the present disclosure is a robot control method for a robot control system, the robot control system including a plurality of robot control devices controlling a plurality of robots, respectively, and a line concentrator connected to the plurality of robot control devices and being capable of constituting a virtual local area network among at least two robot control devices among the plurality of robot control devices, the robot control method including:

one robot control device among the at least two robot control devices setting a plurality of pieces of setting information about the virtual local area network, storing the set plurality of pieces of setting information, and transmitting, to the line concentrator, setting request information requesting setting to a piece of setting information selected from among the plurality of pieces of setting information; and the line concentrator setting the virtual local area network among the at least two robot control devices, based on the setting request information.

Effects of the Invention

According to each aspect of the present disclosure, it is possible to change a combination of a plurality of robots according to work to perform communication only among necessary robots, and reduce traffic among robots.

BRIEF DESCRIPTION OF THE DRAWINGS

FIG. 3 is a diagram showing a setting screen where settings for a VLAN for first work are inputted;

FIG. 4 is a diagram showing the setting screen where settings for a VLAN for second work are inputted;

FIG. 5 is a flowchart showing operation from when a setting unit displaying the setting screen until storing VLAN setting information into a storage unit;

PREFERRED MODE FOR CARRYING OUT THE INVENTION

Embodiments of the present disclosure will be described below in detail using drawings.

First Embodiment

Figure 1:
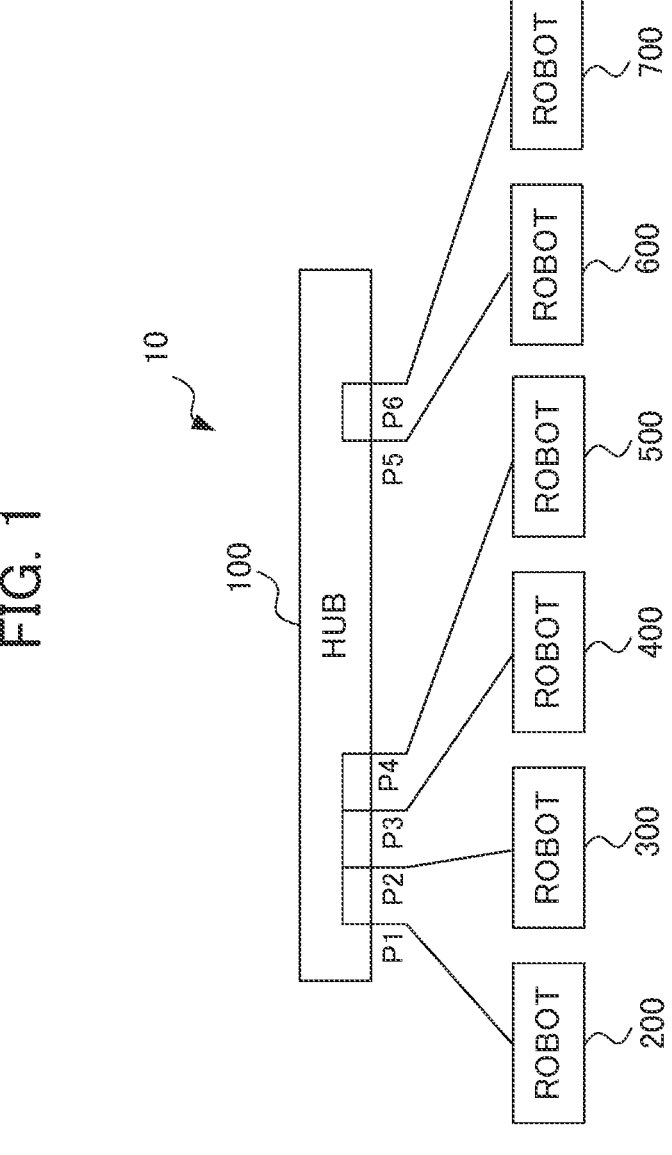
FIG. 1 is a block diagram showing a robot control system of a first embodiment of the present disclosure.

FIG. 1 is a block diagram showing a robot control system according to a first embodiment of the present disclosure. As shown in FIG. 1, a robot control system 10 includes a hub 100 to be a line concentrator, and six robots 200 to 700 that are LAN-connected via the hub 100. The robots 200 to 700 are connected to ports P1 to P6 of the hub 100. FIG. 1 shows an example in which a network is divided by the hub 100, and two independent VLANs are configured for four robots 200 to 500 and for two robots 600 and 700.

The robot control system 10 has a function of performing communication via Ethernet (registered trademark) among the robots and performing prevention of interference among the robots or synchronization among motions of the robots. For example, in the case of carrying one large workpiece by the four robots 200 to 500, carriage of the workpiece by the four robots 200 to 500 can be realized by the robot 200 serving as a leader and the other three robots 300 to 500 making motions, following motions of the robot 200. In this case, from the robot 200 to be the leader to the other three robots 300 to 500, data required for the follow motions is transmitted.

In the case of transmitting the data required for the follow motions from the robot 200 to the other three robots 300 to 500, broadcast can be used for the data transmission. Since the four robots 200 to 500 constitute a VLAN as shown in FIG. 1, communication can be performed only among the robots 200 to 500 requiring transmission/reception of data, and, therefore, communication becomes more smoothly without increase in network traffic.

In the case of cooperated motions among the four robots 200 to 500, it is desirable to constitute a VLAN among the four robots 200 to 500 so that communication is performed only among the four robots 200 to 500. If the workpiece changes, however, the combination of robots also changes, and there may be a case where it is desired to change the combination of robots. For example, there may be a case where work is performed by the robot 200 serving as a leader and other two robots 400 and 500 following motions of the robot 200. Further, there may be a case where, while the robots 200 and 300 make motions to perform work in cooperation, the robots 400 and 500 perform different work in cooperation. In the present embodiment, description will be made on a case where a combination of robots to perform data communication is set by the robot 200 serving as a leader, and changing VLAN settings by giving an instruction from the robot 200 to the hub 100.

Figure 2:
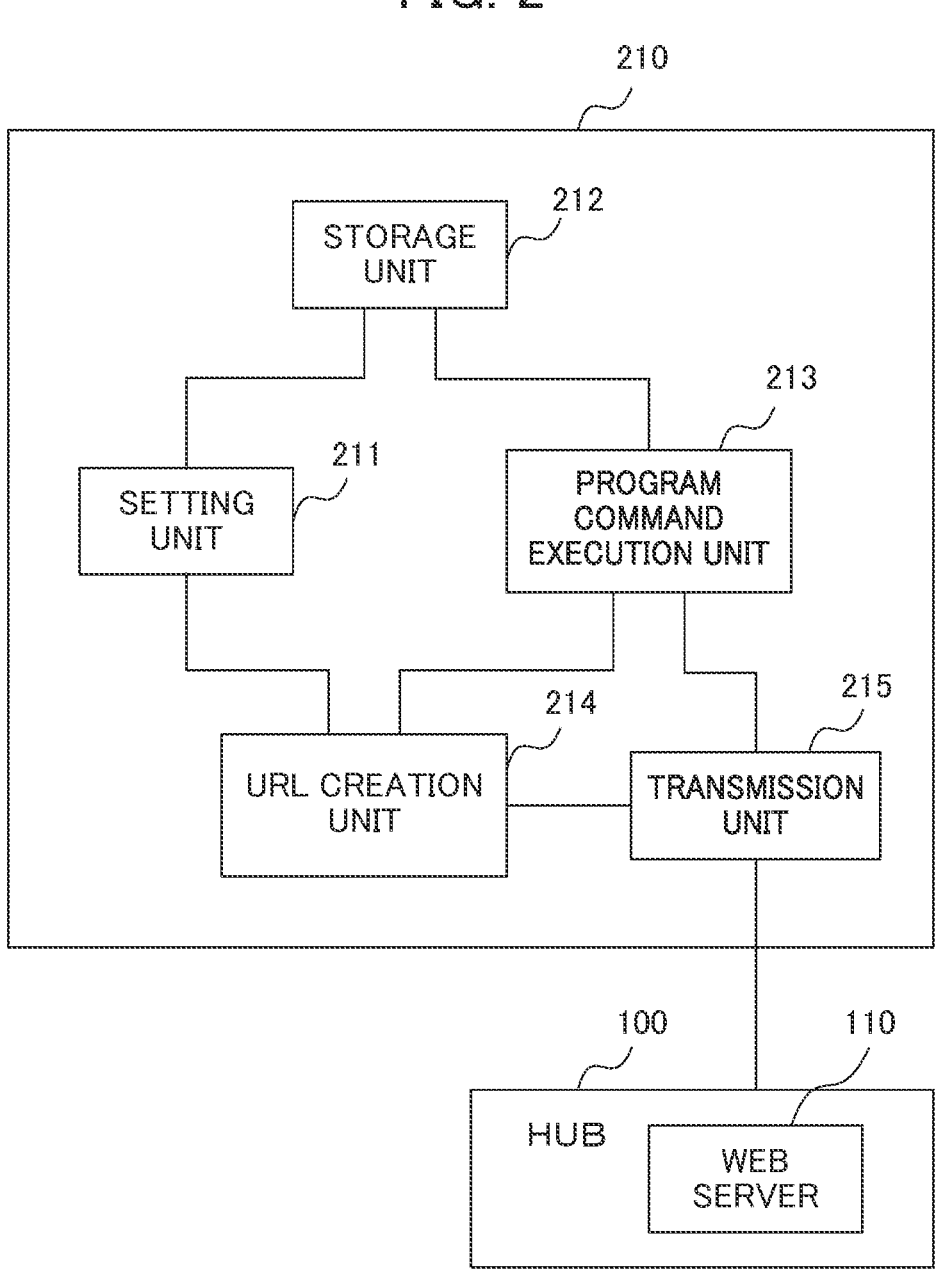
FIG. 2 is a block diagram showing configurations of a robot control device included in each robot and a part of a hub in the robot control system of the first embodiment.

FIG. 2 is a block diagram showing configurations of a robot control device included in each robot and a part of a hub. A robot control device 210 includes a mechanism for causing the robot to perform work, but the function is omitted in FIG. 2. Though the robot control device 210 may be provided separately from the robot, description will be made on the assumption that the robot 200 includes the robot control device 210 in the present embodiment. In FIG. 2, the robot control device 210 includes a setting unit 211, a storage unit 212, a program command execution unit 213, a URL creation unit 214, and a transmission unit 215. The transmission unit 215 communicates with the hub 100 that includes a web server 110.

The setting unit 211 is, for example, an teach pendant provided with a liquid crystal display device equipped with a touch panel, and displays a setting screen for inputting VLAN setting information on the liquid crystal display device. The setting unit 211 stores a plurality of sets of VLAN settings for a plurality of combinations among the four robots 200 to 500 into the storage unit 212. Description will be made below on an example in which the setting unit 211 stores two combinations of robots for which VLAN settings are made, into the storage unit 212 to perform first work and second work by the four robots 200 to 500. The first work is work in which the robot 200 serving as a leader, and the other three robots 300 to 500 make motions, following motions of the robot 200. The second work is work in which the robot 200 serves as a leader, and two other robots 400 and 500 make motions, following motions of the robot 200. The setting unit 211 stores a VLAN setting number to be data accompanying a program to perform the first work (referred to as a setting number SN1), and a VLAN setting number to be data accompanying a program to perform the second work (referred to as a setting number SN2).

First, the setting unit 211 displays the setting screen for setting VLAN setting information for the hub 100, in response to an instruction by a user. The user performs the following operations to input VLAN setting information about the first work on the setting screen. In the description below, description will be made, with a switchport multiple VLAN as an example of a VLAN. The VLAN, however, is not especially limited to the switchport multiple VLAN, and other VLANs such as a port VLAN can be used. As shown on the setting screen shown in FIG. 3, the user makes inputs of setting the VLAN mode to switchport multiple VLAN, setting the group for the port P1 to UV-A to set the port P1 of the hub 100 to uplink VLAN (W-A), and setting the groups for the ports P2 to P4 to CV-A1 to set the ports P2 to P4 of the hub 100 to client VLAN (CV-A). Then, the setting unit 211 associates the inputted VLAN setting information about the first work with the setting number SN1 to be the data accompanying the program for executing the first work, and stores the VLAN setting information and the setting number SN1 into the storage unit 212.

The uplink VLAN is a VLAN for connecting shared equipment such as a hub, and the client VLAN is a VLAN for connecting machines or equipment, such as robots, for which mutual communication is restricted. Though it is possible to perform communication between the port P1 belonging to the uplink VLAN and the ports P2 to P4 belonging to the client VLAN, it is not possible to perform communication among the ports P2 to P4 belonging to the client VLAN.

Next, the setting unit 211 clears the VLAN setting information about the first work on the setting screen in response to an instruction by the user. After that, the user performs the following operations to input VLAN setting information about the second work on the setting screen. As shown on the setting screen shown in FIG. 4, the user makes inputs of setting the VLAN mode to switchport multiple VLAN, setting the group for the port P1 to UV-A to set the port P1 of the hub 100 to uplink VLAN (UV-A), and setting the groups for the ports P3 and P4 to CV-A1 to set the ports P3 and P4 of the hub 100 to client VLAN (CV-A). Then, the setting unit 211 associates the inputted VLAN setting infor-mation about the second work with the setting number SN2 to be the data accompanying the program for executing the second work, and stores the VLAN setting information and the setting number SN2 into the storage unit 212.

Before giving an instruction to execute any of the pro-grams, the program command execution unit 213 outputs a request for setting to a VLAN corresponding to a VLAN setting number (for example, the setting number SN1) to be data accompanying the program to be executed, to the URL creation unit 214. The program command execution unit 213 stores the setting number SN1 to be the data accompanying the program to perform the first work and the setting number SN2 to be the data accompanying the program to perform the second work.

If the hub 100 includes the web server 110 inside, it becomes possible to communicate VLAN setting informa-tion from the storage unit 212 by specifying and transmitting a special URL to be setting request information, from the robot control device 210. Though the hub 100 includes a reception unit that receives the URL from the robot control device 210, description thereof will be omitted because the web server 110 is generally includes the reception unit. The URL creation unit 214 creates a URL, which is a data format for communicating the VLAN setting information corre-sponding to the SN1 stored in the storage unit 212, to the hub 100, and outputs the URL to the transmission unit 215. The transmission unit 215 transmits the URL to the hub 100 as the setting request information. The hub 100 includes the web server 110, and the web server 110 analyzes the received URL, and makes VLAN settings for the hub 100 based on VLAN setting information acquired from the storage unit 212, based on the analyzed URL.

In the first and second embodiments, a hub includes a web server inside, a special URL is specified from a robot control device, and VLAN setting information is communicated from a storage unit. The method for making settings for the hub from the robot control device, however, is not limited thereto. For example, VLAN setting information may be directly included in setting request information without creating a URL.

After that, the program command execution unit 213 starts motions of the robot 200 according to the programs, and instructs the robots 300 to 500 to start synchronized (follow) motions via the transmission unit 215 and the hub 100. Furthermore, the program command execution unit 213 sends motion information to the robots 300 to 500 via the transmission unit 215 and the hub 100 while causing the robot 200 to make motions according to the programs.

The functional blocks included in the robot control device 210 have been described above. In order to realize these functional blocks, the robot control device 210 includes an arithmetic processing device such as a CPU (central pro-cessing unit). Further, the robot control device 210 also includes an auxiliary storage device, such as an HDD, that stores application software or various kinds of control programs such as an OS (operating system), and a main memory such as a RAM (random access memory) for storing data that is temporarily required for the arithmetic processing device to execute a program.

In the robot control device 210, the arithmetic processing device reads application software or the OS from the aux-iliary storage device and performs arithmetic processing based on the application software or the OS, developing the read application software or OS on the main memory. Based on a result of the arithmetic processing, various kinds of pieces of hardware of each device are controlled. Thereby, the functional blocks of the present embodiment are real-ized. That is, the present embodiment can be realized by cooperation between hardware and software.

Figure 5:
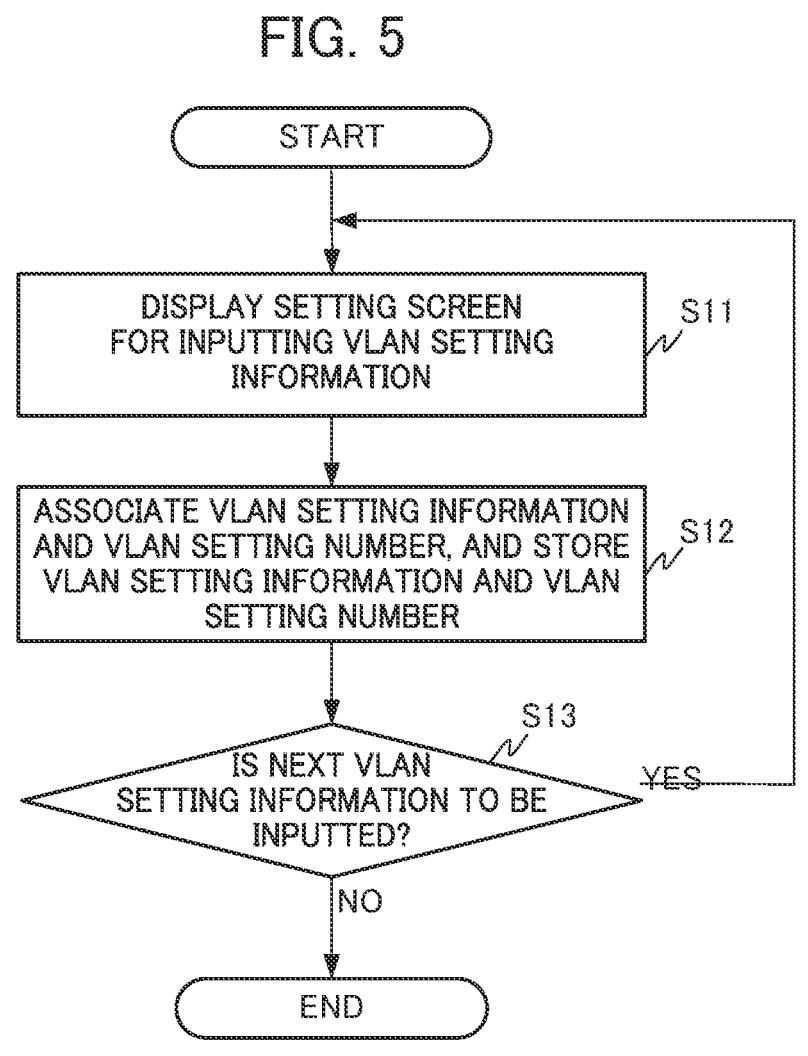

Next, operation of the robot control device 210 will be described using a flowchart. First, description will be made on operation of the setting unit 211 of the robot control device 210 storing VLAN setting information inputted on the setting screen into the storage unit 212. FIG. 5 is a flowchart showing operation from when the setting unit 211 displaying the setting screen until storing VLAN setting information into the storage unit 212.

At Step S11, the setting unit 211 displays the setting screen for setting VLAN setting information for the hub 100 in response to an instruction by the user. At Step S12, the setting unit 211 associates VLAN setting information about work inputted by the user with a VLAN setting number to be data accompanying a program to execute the work, and stores the VLAN setting information and the VLAN setting number into the storage unit 212.

At Step S13, the setting unit 211 judges whether the next VLAN setting information is to be inputted or not, and the setting unit 211 returns to Step S11 if the next VLAN setting information is to be inputted and ends the process if the next VLAN setting information is not to be inputted. The setting unit 211 can judge whether the next VLAN setting infor-mation is to be inputted or not by whether the VLAN setting information about the first work on the setting screen has been cleared by the user or not.

Figure 6:
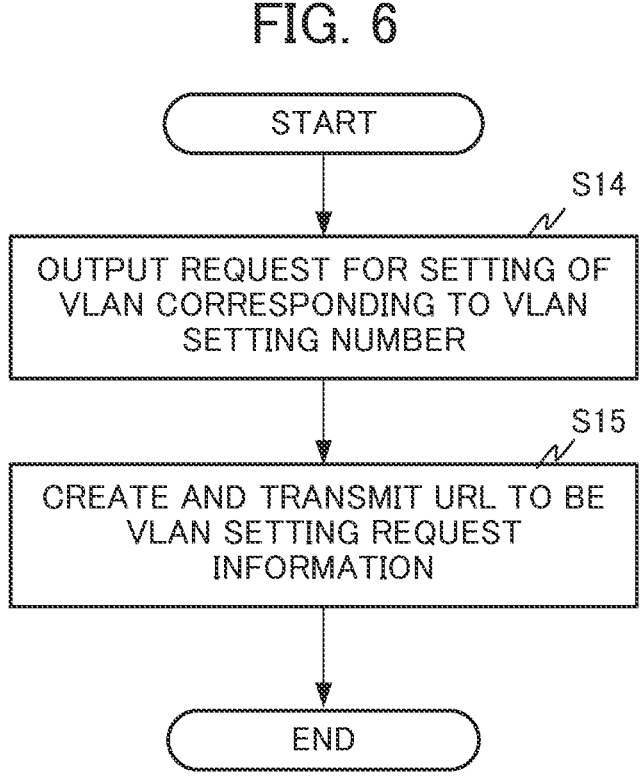
FIG. 6 is a flowchart showing operation from when a program command execution unit outputting a VLAN setting request until a transmission unit transmitting setting request information to the hub.

Next, description will be made on operation of the pro-gram command execution unit 213, the URL creation unit 214, and the transmission unit 215 transmitting a URL as VLAN setting request information to the hub 100. FIG. 6 is a flowchart showing operation from when the program command execution unit 213 outputting a VLAN setting request until the transmission unit 215 transmitting setting request information to the hub. At Step S14, before giving an instruction to execute any of programs, the program com-mand execution unit 213 outputs, based on a VLAN setting number (for example, the setting number SN1) to be data accompanying the program to be executed, a request for setting of a VLAN corresponding the setting number SN1 to the URL creation unit 214.

At Step S15, the URL creation unit 214 creates a URL, which is a data format for communicating the VLAN setting information corresponding to the setting number SN1 stored in the storage unit 212, to the hub 100, and outputs the URL to the transmission unit 215. The transmission unit 215 transmits the URL to the hub 100 as the setting request information.

According to the embodiment described above, it is possible to, by automatically changing a network according to a program, cause only a minimum number of robots to participate in a network. In the case of one-to-one commu-nication, broadcast communication is unnecessary because a hub remembers correspondence between a port and a MAC address. In the case of using broadcast, however, it is possible to improve a communication environment by caus-ing VLAN settings to be made for the hub from a robot. In the present embodiment, the setting unit 211 associates inputted VLAN setting information about work with a VLAN setting number to be data accompanying a program for executing the work, and stores the VLAN setting infor-mation and the VLAN setting number into the storage unit 212. By using a VLAN setting number to be data accom-panying a program as described above, it is possible to, even when the program is copied and modified, save time to set the VLAN setting number for the modified program because the VLAN setting number is copied together with the modified program. Though, in the setting unit 211 of the present embodiment, the information associated with inputted VLAN setting information about work is assumed to be a VLAN setting number to be data accompanying a program for executing the work, the information is not limited thereto and may be, for example, a number of the program for executing the work is also possible. In this case, before giving an instruction to execute the program, the program command execution unit 213 outputs a request for setting to a VLAN corresponding to the number of the program to be executed, to the URL creation unit.

Second Embodiment

In the first embodiment, before giving an instruction to execute any of programs, the program command execution unit 213 reads VLAN setting information corresponding to a VLAN setting number to be data accompanying the program to be executed, from the storage unit 212, and outputs the VLAN setting information to the URL creation unit 214. In the present embodiment, based on an instruction by the user, the setting unit 211 reads VLAN setting information from the storage unit 212 and outputs the VLAN setting information to the URL creation unit 214.

Figure 7:
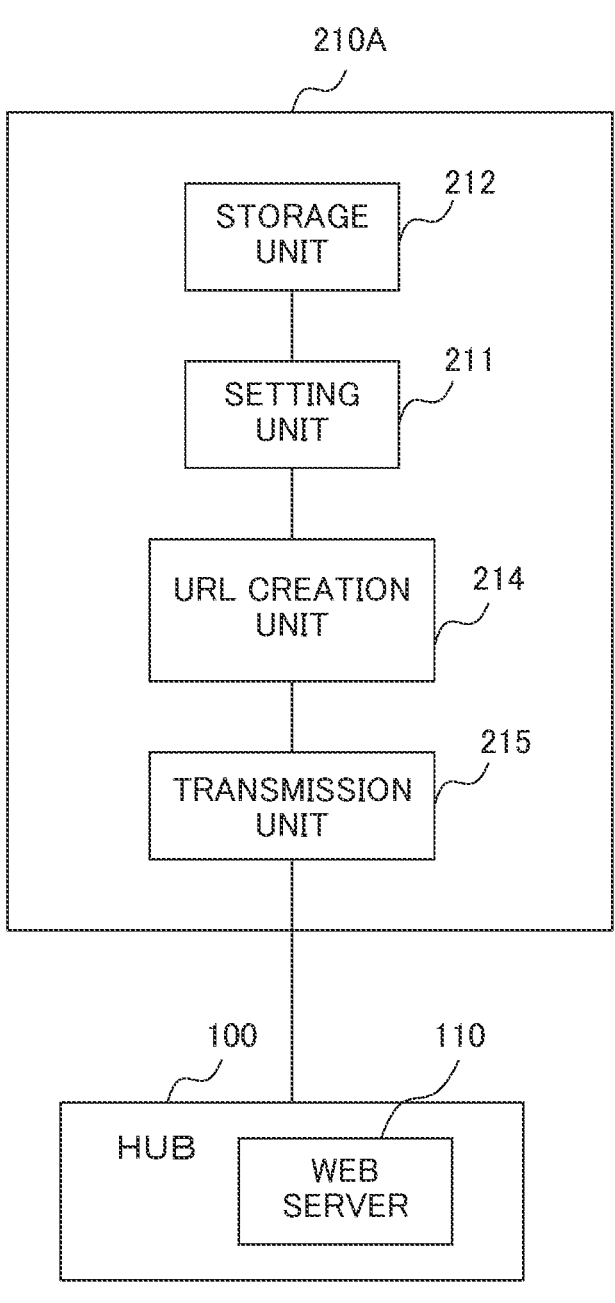
FIG. 7 is a block diagram showing a configuration of a second embodiment of the robot control device included in each robot in the robot control system.

FIG. 7 is a block diagram showing a configuration of a second embodiment of the robot control device included in each robot. The robot control system in the present embodiment is the same as the robot control system shown in FIG. 1. In FIG. 7, a robot control device 210A includes the setting unit 211, the storage unit 212, the URL creation unit 214, and the transmission unit 215. In comparison with the robot control device 210 shown in FIG. 2, the robot control device 210A does not include the program command execution unit 213, and is different in the operation of the setting unit 211.

The setting unit 211 displays the setting screen for inputting VLAN setting information about work of robots, for the hub 100, in response to an instruction by the user, associates the VLAN setting information about the work inputted by the user with a combination number of a combination of connections of robots based on VLAN settings for the work, and stores the VLAN setting information and the combination number into the storage unit 212. In the first embodiment, VLAN setting information about work inputted by the user is associated with a VLAN setting number to be data accompanying a program and stored in the storage unit 212, but, in the present embodiment, is associated with a combination number of a combination of connections of robots based on VLAN settings for the work and stored into the storage unit 212.

Description will be made below on an example in which, similarly to the first embodiment, the setting unit 211 stores two combinations into the storage unit 212 to perform first work and second work among the four robots 200 to 500. In the description below, only operations different from the first embodiment will be described.

First, the setting unit 211 displays the setting screen for setting VLAN setting information for the hub 100, in response to an instruction by the user, associates inputted VLAN setting information about the first work inputted by the user with a combination number (a combination number N1) of a combination of connections of robots based on VLAN settings for the first work, and stores the VLAN setting information and the combination number into the storage unit 212.

Next, the setting unit 211 displays the setting screen for setting VLAN setting information for the hub 100, in response to an instruction by the user, associates the inputted VLAN setting information about the second work inputted by the user with a combination number (a combination number N2) of a combination of connections of robots based on VLAN settings for the second work, and stores the VLAN setting information and the combination number into the storage unit 212.

After that, the setting unit 211 displays a selection screen for selecting a plurality of combinations among the four robots 200 to 500 stored in the storage unit 212, in response to an instruction by the user. On the selection screen, the combination numbers N1 and N2, and connection relationships between the ports and the robots are shown. By the user selecting the combination number N1 or N2, the setting unit 211 outputs a request for setting to VLAN setting information corresponding to the combination number N1 or N2 selected by the user, to the URL creation unit 214.

The URL creation unit 214 creates a URL, which is a data format for communicating the VLAN setting information corresponding to the combination number N1 or N2 stored in the storage unit 212, to the hub 100, and outputs the URL to the transmission unit 215.

Figure 8:
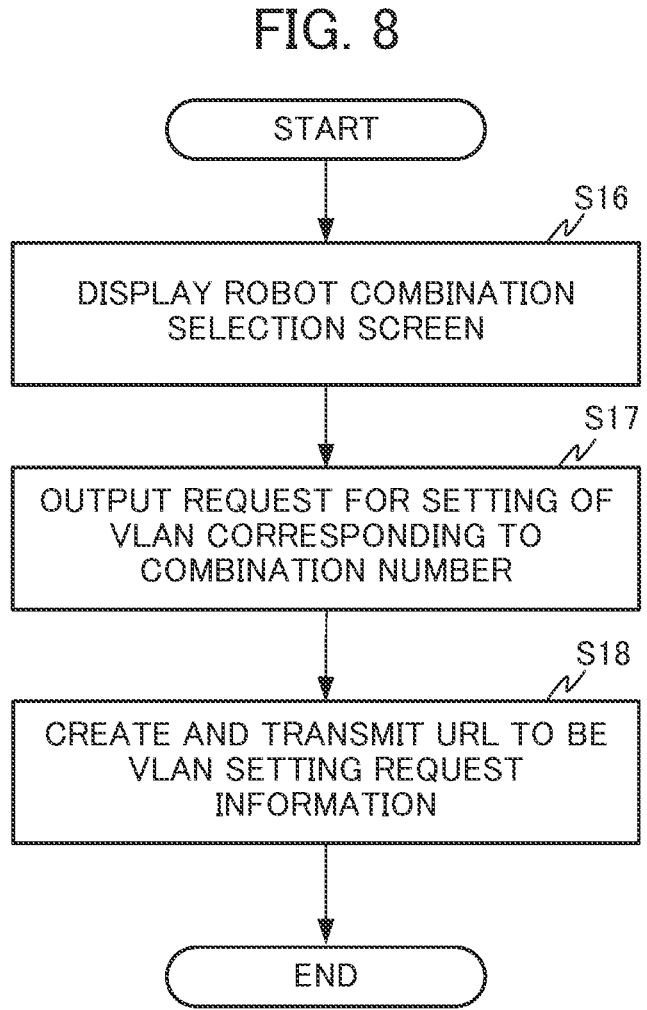
FIG. 8 is a flowchart showing operation from when the setting unit outputting a VLAN setting request until the transmission unit transmitting setting request information to the hub.

Next, operation of the robot control device 210A will be described using a flowchart. FIG. 8 is a flowchart showing operation from when the setting unit 211 outputting a VLAN setting request until the transmission unit 215 transmitting setting request information to the hub. Operation of the setting unit 211 of the robot control device 210A storing VLAN setting information inputted on the setting screen into the storage unit 212 is the same as the operation of the first embodiment described using FIG. 5 except that a VLAN setting number to be data accompanying a program is replaced with a combination number.

At Step S16, the setting unit 211 displays the selection screen for selecting a plurality of combinations among the robots 200 to 500 in response to an instruction by the user. At Step S17, a request for setting of a VLAN corresponding to the combination number N1 or N2 selected by selection by the user is outputted to the URL creation unit 214.

At Step S18, the URL creation unit 214 creates a URL, which is a data format for communicating the VLAN setting information corresponding to the combination number N1 or N2 stored in the storage unit 212, to the hub 100, and outputs the URL to the transmission unit 215. The transmission unit 215 transmits the URL to the hub 100 as the setting request information.

According to the embodiment described above, it is possible to, by changing a network in response to an instruction by the user, cause only a minimum number of robots to participate in a network.

In the first and second embodiments described above, description has been made on setting of VLANs, with the first work in which the robot 200 serves as a leader, and the other three robots 300 to 500 make motions, following motions of the robot 200, and the second work in which the robot 200 serves as a leader, and two other robots 400 and 500 make motions, following motions of the robot 200 given as an example. Setting of VLANs, however, is not limited to the example of the first and second work, and may be for other pieces of work. Setting of VLANs also includes a case of not setting VLANs. That is, a case of setting VLANs for a network for which no VLAN is set, a case of changing setting of VLANs, and a case of canceling setting of VLANs to constitute a network for which no VLAN is set are also included. Further, a robot that makes setting of VLANs is not limited to the robot 200, and may be any of the robots

300 to 500. If one VLAN is set, and no change is to be made, the VLAN can be set using the setting unit 211 first.

In the first and second embodiments, the setting unit 211 displays the setting screen for setting VLAN setting information for the hub 100 in response to an instruction by the user, and the user inputs VLAN setting information on the setting screen. However, the setting unit 211 and a personal computer may be connected so that the personal computer displays the setting screen for setting VLAN setting information for the hub 100 in response to an instruction by the user, the user inputs VLAN setting information about work on the setting screen, and the personal computer transmits the VLAN setting information to the setting unit 211 together with a VLAN setting number to be data accompanying a program or a combination number of a combination of connections of robots. Furthermore, in the case of selecting a plurality of combinations among robots 200 to 500 in response to an instruction by the user, the personal computer may display the selection screen in response to an instruction by the user, instead of the setting unit 211; and, by the user selecting the combination number N1 or N2 on the selection screen, the setting unit 211 may read VLAN setting information corresponding to the combination number N1 or N2 selected by the user from the storage unit 212 and output the VLAN setting information to the URL creation unit 214.

An operation or process to start operation of transmitting VLAN setting information to the hub is execution of a program in the first embodiment, and an instruction operation by the user in the second embodiment, but is not limited thereto.

The first and second embodiments have been described above. Each component included in the robot control device of each embodiment can be realized by hardware, software, or a combination thereof. A robot control method implemented by cooperation among the components included in the robot control device described above can also be realized by hardware, software, or a combination thereof. Here, being realized by software means being realized by a computer reading and executing a program.

The program can be supplied to the computer by being stored in any of various types of non-transitory computer-readable media. The non-transitory computer-readable media include various types of tangible storage media. The non-transitory computer-readable media are, for example, a magnetic recording medium (for example, a hard disk drive), a magneto-optical recording medium (for example, a magneto-optical disk), a CD-ROM (read-only memory), a CD-R, a CD-R/W, and a semiconductor memory (for example, a mask ROM, a PROM (programmable ROM), an EPROM (erasable PROM), a flash ROM, and a RAM (random access memory)).

Each of the embodiments described above is a preferred embodiment of the present invention. The scope of the present invention, however, is not limited to the above embodiments, and the present invention can be practiced in embodiments in which various changes are made within a range not departing from the spirit of the present invention.

For a robot control device, a robot control system, and a robot control method according to the present disclosure, various embodiments having the following configurations, including the above embodiments, are possible.

(1) A robot control device (for example, the robot control device 210) connected to a line concentrator (for example, the hub 100) and constituting a virtual local area network together with at least one other robot control device connected to the line concentrator, the robot control device including:

a setting unit (for example, the setting unit 211) setting a plurality of pieces of setting information about the virtual local area network;

a storage unit (for example, the storage unit 212) storing the plurality of pieces of setting information set by the setting unit; and a transmission unit (for example, the transmission unit 215) transmitting, to the line concentrator, setting request information requesting setting to a piece of setting information selected from among the plurality of pieces of setting information. According to the robot control device, it is possible to change a combination of a plurality of robots according to work to perform communication only among necessary robots, and reduce traffic among robots.

(2) The robot control device according to (1) above, wherein an instruction to start follow motions is transmitted to the at least one other robot control device via the transmission unit and the line concentrator.

(3) The robot control device according to (1) or (2) above, including a program command execution unit (for example, the program command execution unit 213) giving instructions to execute programs, wherein the setting unit associates virtual local area network setting numbers accompanying the programs with the plurality of pieces of setting information, respectively, and stores the virtual local area network setting numbers and the plurality of pieces of setting information into the storage unit; and before giving an instruction to execute any of the programs, the program command execution unit outputs a request for setting to a piece of setting information corresponding to a virtual local area network setting number accompanying the program to be executed; and the transmission unit transmits, to the line concentrator, setting request information requesting setting to the piece of setting information corresponding to the setting number, the setting request information being created based on the setting request. According to the robot control device, it is possible to automatically make settings for a virtual local area network (VLAN) before executing a program.

(4) The robot control device according to (1) or (2) above, wherein the setting unit associates combination numbers indicating combinations of connections of robots for the virtual network with the plurality of pieces of setting information, respectively, stores the combination numbers and the plurality of pieces of setting information into the storage unit, and outputs a request for setting to a piece of setting information corresponding to an inputted combination number; and the transmission unit transmits, to the line concentrator, setting request information requesting setting to the piece of setting information corresponding to the combination number, the setting request information being created based on the setting request. According to the robot control device, it is possible to make settings for a virtual local area network (VLAN) by an instruction by a user.

(5) A robot control system (for example, the robot control system 10) including a plurality of robot control devices controlling a plurality of robots, respectively, and a line concentrator (for example, the hub 100) connected to the plurality of robot control devices and being capable of constituting a virtual local area network among at least two robot control devices among the plurality of robot control devices, wherein one robot control device (for example, the robot control device 210) among the at least two robot control devices includes a setting unit (for example, the setting unit 211) setting a plurality of pieces of setting information about the virtual local area network, a storage unit (for example, the storage unit 212) storing the plurality of pieces of setting information set by the setting unit, and a transmission unit (for example, the transmission unit 215) transmitting, to the line concentrator, setting request information requesting setting to a piece of setting information selected from among the plurality of pieces of setting information; and the line concentrator sets the virtual local area network among the at least two robot control devices, based on the setting request information. According to the robot control system, it is possible to change a combination of a plurality of robots according to work to perform communication only among necessary robots, and reduce traffic among robots.

(6) The robot control system according to (5) above, wherein the one robot control device serves as a leader, and one or more robot control devices other than the one robot control device, among the at least two robot control devices, make motions, following motions of the one robot control device.

(7) The robot control system according to (5) or (6) above, wherein the one robot control device includes a program command execution unit (for example, the program command execution unit 213) giving instructions to execute programs; the setting unit associates virtual local area network setting numbers accompanying the programs that the one robot control device gives the instructions to execute, with the plurality of pieces of setting information, respectively, and stores the virtual local area network setting numbers and the plurality of pieces of setting information into the storage unit; before giving an instruction to execute any of the programs, the program command execution unit outputs a request for setting to a piece of setting information corresponding to a virtual local area network setting number accompanying the program to be executed; and the transmission unit transmits, to the line concentrator, setting request information requesting setting to the piece of setting information corresponding to the setting number, the setting request information being created based on the setting request. According to the robot control system, it is possible to automatically make settings for a virtual local area network (VLAN) before executing a program.

(8) The robot control system according to (5) or (6) above, wherein the setting unit associates combination numbers indicating combinations of connections of robots for the virtual network with the plurality of pieces of setting information, respectively, stores the combination numbers and the plurality of pieces of setting information into the storage unit, and outputs a request for setting to a piece of setting information corresponding to an inputted combination number; and the transmission unit transmits, to the line concentrator, setting request information requesting setting to the piece of setting information corresponding to the combination number, the setting request information being created based on the setting request. According to the robot control system, it is possible to make settings for a virtual local area network (VLAN) by an instruction by the user.

(9) A robot control method for a robot control system (for example, the robot control system 10), the robot control system including a plurality of robot control devices controlling a plurality of robots, respectively, and a line concentrator (for example, the hub 100) connected to the plurality of robot control devices and being capable of constituting a virtual local area network among at least two robot control devices (for example, the robot control device 210) among the plurality of robot control devices, the robot control method including:

one robot control device among the at least two robot control devices setting a plurality of pieces of setting information about the virtual local area network, storing the set plurality of pieces of setting information, and transmitting, to the line concentrator, setting request information requesting setting to a piece of setting information selected from among the plurality of pieces of setting information; and the line concentrator setting the virtual local area network among the at least two robot control devices, based on the setting request information. According to the robot control method, it is possible to change a combination of a plurality of robots according to work to perform communication only among necessary robots, and reduce traffic among robots.

EXPLANATION OF REFERENCE NUMERALS

10 Robot control system
100 Hub
110 Web server
200 to 700 Robot
211 Setting unit
212 Storage unit
213 Program command execution unit
214 URL creation unit
215 Transmission unit

The invention claimed is:

1. A robot control device connected to a line concentrator and constituting a virtual local area network together with at least one other robot control device connected to the line concentrator, the robot control device comprising:

a first memory configured to store a program; and a processor configured to execute the program and control the robot control device to:

set a plurality of pieces of setting information about the virtual local area network;

store the plurality of pieces of setting information into a second memory; and transmit, to the line concentrator, setting request information requesting setting to a piece of setting information selected from among the plurality of pieces of setting information, wherein the robot control device is located separately from the line concentrator and serves as a leader, and wherein the robot control device transmits an instruction to start follow motions to the at least one other robot control device via the line concentrator, after the virtual local area network is set in the line concentrator based on the setting request information.

2. The robot control device according to claim 1, wherein the processor is further configured to give instructions to execute programs, and to execute the program and control the robot control device to:

associate virtual local area network setting numbers accompanying the programs with the plurality of pieces of setting information, respectively, and store the virtual local area network setting numbers and the plurality of pieces of setting information into the second memory;

before giving an instruction to execute one program of the programs, output a request for setting to a piece of setting information corresponding to a virtual local area network setting number accompanying the one program to be executed; and transmit, to the line concentrator, setting request information requesting setting to the piece of setting information corresponding to the setting number, the setting request information being created based on the setting request.

3. The robot control device according to claim 1, wherein the processor is configured to execute the program and control the robot control device to:

associate combination numbers indicating combinations of connections of robots for the virtual local area network with the plurality of pieces of setting information, respectively, store the combination numbers and the plurality of pieces of setting information into the second memory, and output a request for setting to a piece of setting information corresponding to an inputted combination number; and transmit, to the line concentrator, setting request information requesting setting to the piece of setting information corresponding to the combination number, the setting request information being created based on the setting request.

4. A robot control system comprising a plurality of robot control devices controlling a plurality of robots, respectively, and a line concentrator connected to the plurality of robot control devices and being capable of constituting a virtual local area network among at least two robot control devices among the plurality of robot control devices, wherein one robot control device among the at least two robot control devices comprises:

a first memory configured to store a program; and a processor configured to execute the program and control the one robot control device to:

set a plurality of pieces of setting information about the virtual local area network;

store the plurality of pieces of setting information into a second memory; and transmit, to the line concentrator, setting request information requesting setting to a piece of setting information selected from among the plurality of pieces of setting information, wherein the line concentrator sets the virtual local area network among the at least two robot control devices, based on the setting request information, wherein the one robot control device and one or more robot control devices other than the one robot control device, among the at least two robot control devices, are located separately from the line concentrator, and the one robot control device serves as a leader, and wherein the one robot control device transmits an instruction to start follow motions to the one or more robot control devices via the line concentrator, after the virtual local area network is set in the line concentrator based on the setting request information.

5. The robot control system according to claim 4, wherein the processor is further configured to give instructions to execute programs, and to execute the program and control the robot control device to:

associate virtual local area network setting numbers accompanying the programs that the one robot control device gives the instructions to execute, with the plurality of pieces of setting information, respectively, and store the virtual local area network setting numbers and the plurality of pieces of setting information into the second memory;

before giving an instruction to execute one program of the programs, output a request for setting to a piece of setting information corresponding to a virtual local area network setting number accompanying the one program to be executed; and transmit, to the line concentrator, setting request information requesting setting to the piece of setting information corresponding to the setting number, the setting request information being created based on the setting request.

6. The robot control system according to claim 4, wherein the processor is configured to execute the program and control the robot control device to:

associate combination numbers indicating combinations of connections of robots for the virtual local area network with the plurality of pieces of setting information, respectively, store the combination numbers and the plurality of pieces of setting information into the second memory, and output a request for setting to a piece of setting information corresponding to an inputted combination number; and transmit, to the line concentrator, setting request information requesting setting to the piece of setting information corresponding to the combination number, the setting request information being created based on the setting request.

7. A robot control method for a robot control system, the robot control system comprising a plurality of robot control devices controlling a plurality of robots, respectively, and a line concentrator connected to the plurality of robot control devices and being capable of constituting a virtual local area network among at least two robot control devices among the plurality of robot control devices, the robot control method comprising:

one robot control device among the at least two robot control devices setting a plurality of pieces of setting information about the virtual local area network, storing the set plurality of pieces of setting information, and transmitting, to the line concentrator, setting request information requesting setting to a piece of setting information selected from among the plurality of pieces of setting information; and the line concentrator setting the virtual local area network among the at least two robot control devices, based on the setting request information, wherein the one robot control device and one or more robot control devices other than the one robot control device, among the at least two robot control devices, are located separately from the line concentrator, and the one robot control device serves as a leader, and wherein the one robot control device transmits an instruction to start follow motions to the one or more robot control devices via the line concentrator, after the virtual local area network is set in the line concentrator based on the setting request information.

* * * * *